Jan. 29, 1929.
J. BIJUR
1,700,214
ENGINE STARTING APPARATUS
Original Filed Feb. 1, 1917
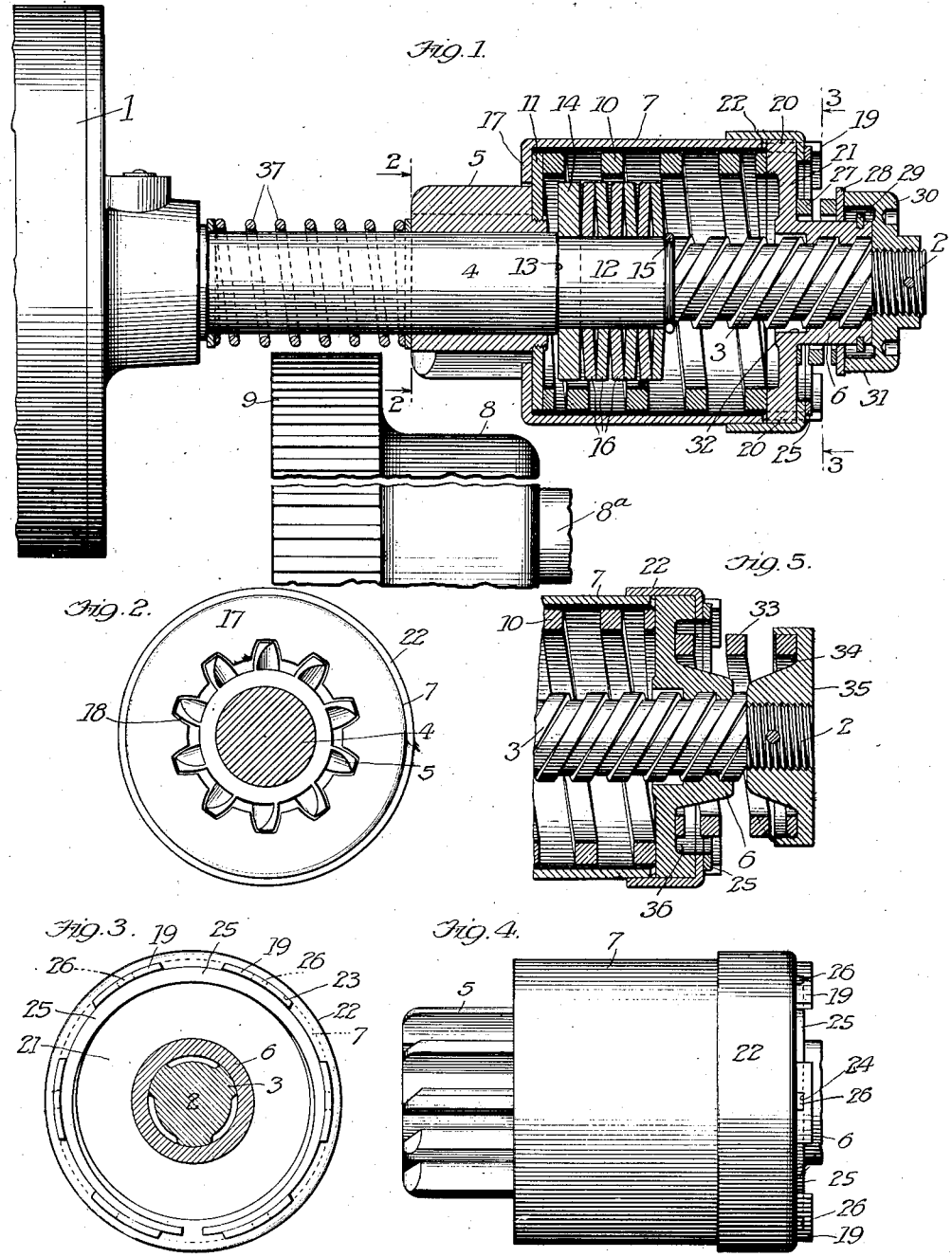

Patented Jan. 29, 1929.

1,700,214

UNITED STATES PATENT OFFICE.

JOSEPH BIJUR, OF NEW YORK, N. Y., ASSIGNOR TO ECLIPSE MACHINE COMPANY, OF ELMIRA HEIGHTS, NEW YORK, A CORPORATION OF NEW YORK.

ENGINE-STARTING APPARATUS.

Original application filed February 1, 1917, Serial No. 145,839. Divided and this application filed September 26, 1924. Serial No. 739,986.

My invention relates to apparatus for starting an engine such as an internal combustion engine and the object thereof is to provide a practical, reliable and compact means adapted to form the drive or transmission between such engine and the prime mover, such as an electric motor, such means being constructed and arranged to effect proper application of the starting power to the engine in efficient and proper manner under all conditions of operation.

In the accompanying drawing, Fig. 1 is a longitudinal view partly in section of one embodiment of my invention; Fig. 2 a section on the line 2—2 of Fig. 1; Fig. 3 a section on the line 3—3 of Fig. 1; Fig. 4 an elevation of a portion of the drive assembly; and Fig. 5 a modified form of the end-stop construction.

While I have herein shown my invention as embodied in a drive or transmission of the inboard form it will be understood that it is equally applicable to the outboard form and also that my invention may be embodied in the indirect type of drive as well as the direct drive herein illustrated in which the driving shaft of such drive is the extended armature shaft.

The electric starting motor 1 is of the usual type and has an extended armature shaft 2 which is provided with screw threads 3 located at the outer end thereof, inasmuch as the particular embodiment being described is of the inboard type. This shaft is provided at its inner end with an unthreaded or plain portion 4. The drive or transmission is in the form of a torque transmitting assembly or unit comprising a driving member here in the form of a gear or pinion 5 and a control member here in the form of a nut 6 and an operating connection between the pinion and nut, here in the form of a barrel 7. This barrel is rigidly secured to the nut for the purpose of positively transmitting the motion of rotation from the nut or movable abutment to the pinion.

The pinion 5 has a smooth or unthreaded bore and is adapted to slide upon the plain or unthreaded portion 4 of the shaft 2. The nut 6 is threaded upon the threads 3 of the shaft 2 with the result that, by reason of the rotation of the armature shaft, the nut and consequently the barrel and pinion have a longitudinal movement on the shaft and a rotary movement therewith. By reason of such longitudinal movement the pinion is brought into engagement or mesh with a gear or member of the engine to be started, which member in the present instance is a fly wheel 8, having teeth 9 and provided with the usual shaft 8ª.

Between the nut 6 and the pinion 5 there is interposed a coil spring 10 which by preference bears at its inner end against a ring 11 secured to the pinion instead of bearing against the pinion direct. This spring surrounds the shaft 2 and is in turn surrounded by the barrel 7.

The shaft 2 is provided intermediate its length between its plain portion and the threaded portion with a reduced smooth or unthreaded portion 12, which forms an abutting shoulder 13 against which abuts a stop piece or ring 14 surrounding the shaft. Between this ring and a locking ring 15 fitting in a groove in the shaft at the junction with the threaded portion thereof, there are located a number of dished washers 16. In this particular case, six washers are shown arranged in three pairs, the members of each pair having their concavities facing each other. It is obvious that a different number and different arrangement of such washers might be used to advantage, but this particular arrangement is of special utility.

The barrel 7 not only contains the spring 10 and the washers 16, but also forms the operating or driving connection between the nut 6 and the pinion 5, the same being rigidly connected with one of them and loosely connected with the other. For this purpose and in the present instance, the inturned forward end 17 of the barrel is provided with a central opening with radiating serrations or teeth 18 corresponding in number and size to the teeth of the pinion and interlocking therewith, whereby the pinion may be positively rotated by the barrel, but such barrel may have longitudinal movement with respect thereto.

The nut 6 is directly connected with the barrel 7 by any desired means, preferably by the cooperation of lugs integral with the nut and slots in the barrel, whereby there is a positive unyielding drive between the nut and the pinion. As herein shown the nut 6 is rigidly but detachably secured or connected with the barrel 7 by interlocking therewith in the manner indicated in Figs.

1 and 3. The barrel is provided at its right hand end with longitudinally extending projections or tongues 19 between which fit corresponding projections 20 of the periphery of the flange 21 of the nut. In order to keep these parts in place a cap ring 22 is provided, the same fitting upon the right hand end of the barrel and having an inturned marginal flange which bears against the right hand face of the flange 21 of the nut. The projections or tongues 19 extend through corresponding slots 23 in the ring 22 and have openings 24 adjacent its outer end as shown in Fig. 4. A spring metal split ring 25, having small lugs 26 on its outer periphery adapted to register with the openings 24, is snapped in place with such lugs fitting in said openings firmly to lock the ring 22 in position.

The end-stop arrangement shown in Fig. 1 comprises more particularly a coiled spring 27 which is carried by the torque transmitting mechanism or assembly. This spring surrounds the sleeve portion of the nut 6 and is at one end in abutting relation to the right hand face of the flange 21 of such nut, and at its other end presses against a ring 28. This latter ring is in slidable relation with respect to the nut and is limited against movement off the nut by a stop ring 29, secured preferably in a groove in the sleeve of the nut, such spring 27 tending to hold the ring 28 against the stop ring 29. The end-stop 30, which is preferably screw threaded and pinned to the shaft, has a longitudinal flange 31 extending substantially parallel to the shaft and surrounding the end-stop 30, positively to limit the movement of the ring 28 before the nut in its movement away from the fly wheel has reached the end of its path, thereby causing compression of the spring 27, with consequent effective taking up of the shock of impact and performance of other functions.

It is to be noted that, as shown in Fig. 1, the bore of the nut 6 is unthreaded at 32 for a small distance from the side adjacent the dished washers 16, and said bore is of a diameter large enough to enable this end of the nut to telescope over that portion of the shaft bearing said washers, thereby compressing them, as will be hereinafter more fully described.

In Fig. 5 I have shown a modified form of end-stop arrangement which may be used to advantage, particularly in the form of apparatus shown in Fig. 1. In this form one end of a coil spring 33 is maintained within an annular depression 34 in the end-stop 35, which stop is secured to the shaft 2 in any desired manner, as by threading and pinning the same thereto. The nut 6 has an annular depression 36 which forms an effective seat for the other end of the spring 33, whereby the moving parts are cushioned by the compression of the spring when the nut approaches the end-stop 35. In this form the nut 6 in unthreaded for a small distance, as in Fig. 1, and for the same purpose as in said figure.

Describing a cycle of operation and starting with the parts in their normal position as shown in Fig. 1, when the starting switch is closed and the motor and its extended shaft 2 are set in rotation, the entire drive assembly will travel longitudinally along the shaft, (in the present instance inwardly towards the motor) because of the inertia of such assembly and because of the friction due to the spring 27 and the ring 28 and adjoining parts, all of which will tend to prevent the nut 6 from rotating. The nut 6 will thus travel substantially longitudinally along the shaft, carrying with it such assembly, that is, the combined shifting and torque transmitting mechanism, and in particular pushing the gear or pinion 5 through the spring 10 along the smooth portion 4 of the shaft 2 and into mesh with the gear or teeth 9 of the flywheel. When the teeth of the pinion are properly alined with the spaces between the fly wheel teeth, the pinion will thus be pushed into full mesh with the gear or fly wheel, this action causing a compression of the light spring 37 which is interposed between the pinion 5 and the motor frame. During this operation the nut 6 is moved comparatively rapidly until it is yieldingly arrested by the dished washers 16, which happens substantially simultaneously with the full meshing of the gears. The shock due to the impact of the nut against the washers is gradually absorbed and such washers will be compressed until the nut binds upon and becomes locked to the shaft, whereupon the pinion will be rotated by such nut through its flange 21 and barrel 7, and consequently the fly wheel will in turn be rotated.

After the engine has started on its own power, it drives the pinion at a speed greater than that at which the motor drives it, whereupon the nut will overrun the turning shaft 2 and the nut will have a longitudinal component of movement towards the motor and will carry with it its attached parts. The entire drive assembly thus moves out of mesh with the fly wheel and longitudinally of the shaft until such movement is arrested yieldingly by the spring 27. The nut continues its motion causing its sleeve portion to slide within the ring 28 and the spring 27 to be compressed. The outer end of such nut finally contacts the stop 30 but the shock of impact thereagainst is prevented or relieved by the action of the spring 27.

By the use of the spring 37, the objectionable butting of teeth between the gears when the engine is started at low speed is prevented by reason of the fact that some longitudinal pressure is transmitted through the pinion 5, spring 10 and the nut 6, causing the latter to bind somewhat on the threaded part of the shaft. This binding will tend to make the nut turn together with the screw shaft and thus any tendency of the assembly or unit to move towards the fly wheel, after the engine is running, is effectively overcome, eliminating all chattering and damage to the teeth.

If, when the starting switch is closed, the teeth of the pinion and the fly wheel should meet end to end, proper meshing is enforced in a manner now to be described. Assuming the parts to be in the position shown in Fig. 1, except that the assembly has moved longitudinally and that the teeth of the gears are in butting relation, the nut will continue traveling longitudinally towards the fly wheel, partially compressing the spring 10 until such time as the nut will bind on the screw threads of the shaft with such force that torque is transmitted from the screw shaft through the nut and barrel to turn the pinion. The instant the teeth are turned into proper alinement, the compressed spring 10 will expand rapidly to urge the pinion into full mesh with the fly wheel gear, after which normal operation takes place. In this operation the longitudinal travel of the nut on the screw shaft will ordinarily be such as not to reach the dished washers, but this may happen in a severe case of butting. However, in each case, the resulting action will be the same, that is, the final slight rotary movement of the pinion to relieve the butting and enforce meshing with the fly wheel.

It will thus be seen that there is herein described an apparatus in which the several features of this invention are embodied and which apparatus in its action attains the various objects of the invention and is well suited to meet the requirements of practical use.

I claim:

1. In a starter for gas engines and the like, a drive comprising a rotatable shaft, a driving member mounted thereon for longitudinal movement thereof and rotary movement therewith and adapted to cooperate with and drive a member of the engine to be started, a control member mounted on said shaft for longitudinal movement thereof and rotary movement therewith, and a driving connection between such members, such connection being rigidly secured to one of the members and connected with the other member for relative longitudinal movement.

2. In a starter for gas engines and the like, a drive comprising a rotatable shaft, a driving member mounted thereon for longitudinal movement thereof and rotary movement therewith and adapted to cooperate with and drive a member of the engine to be started, a control member mounted on said shaft for longitudinal movement thereof and rotary movement therewith, and a driving connection between such members, such connection being rigidly secured to the control member and connected with the driving member for relative longitudinal movement.

3. In a starter for gas engines and the like, a drive comprising a rotatable shaft, a driving member mounted thereon for longitudinal movement thereof and rotary movement therewith and adapted to cooperate with and drive a member of the engine to be started, a control member mounted on said shaft for longitudinal movement thereof and rotary movement therewith, a spring between said two members, and a barrel surrounding said spring and forming the driving connection between said members, such barrel being rigidly secured to the control member and connected with the driving member for relative longitudinal movement.

4. In a starter for gas engines and the like, a drive comprising a rotatable shaft, a driving member mounted thereon for longitudinal movement thereof and rotary movement therewith and adapted to cooperate with and drive a member of the engine to be started, a control member mounted on said shaft for longitudinal movement thereof and rotary movement therewith and thereon, and a positive driving connection between said two members.

5. In a starter for gas engines and the like, a drive comprising a rotatable shaft, a driving member mounted thereon for longitudinal movement thereof and rotary movement therewith and adapted to cooperate with and drive a member of the engine to be started, a control member mounted on said shaft for longitudinal movement thereof and rotary movement therewith, and a barrel rigidly secured to the control member and connected with the driving member for rotating it and for longitudinal movement with respect thereto.

6. In a starter for gas engines and the like, a drive comprising a rotatable shaft, a driving member mounted thereon for longitudinal movement thereof and rotary movement therewith and adapted to cooperate with and drive a member of the engine to be started, a control member mounted on said shaft for longitudinal movement thereof and rotary movement therewith, and having a flange, and a barrel rigidly secured to such flange and connected with the driving member for rotating it and for longitudinal movement with respect thereto.

7. In a starter for gas engines and the like, a drive comprising a rotatable shaft, a driving member mounted for longitudinal movement with respect thereto and rotary movement therewith and adapted to cooperate with and drive a member of the engine to be started, a control member in the form of a nut threaded on the shaft for longitudinal movement thereof and rotary movement therewith, and a barrel rigidly secured to such control member and connected with the driving member for rotating it and for longitudinal movement with respect thereto.

8. In a starter for gas engines and the like, a drive comprising a rotatable shaft, a driving member mounted for longitudinal movement with respect thereto and rotary movement therewith and adapted to cooperate with and drive a member of the engine to be started, a control member in the form of a nut threaded on the shaft for longitudinal movement thereof and rotary movement therewith, said shaft having screw threads at one end and being smooth at the other end with an intermediate smooth portion of lesser diameter, a yielding means located on such intermediate portion and in the path of said nut, and a driving connection located between said two members and rigidly secured to one of them.

9. In a starter for gas engines and the like, a drive comprising a rotatable shaft, a driving member mounted for longitudinal movement with respect thereto and rotary movement therewith and adapted to cooperate with and drive a member of the engine to be started, a control member in the form of a nut threaded on the shaft for longitudinal movement thereof and rotary movement therewith, said shaft having screw threads at one end and being smooth at the other end with an intermediate smooth portion of lesser diameter, a series of dished washers located on such intermediate portion and in the path of said nut, and a driving connection located between said two members and rigidly secured to one of them.

10. In a starter for gas engines and the like, a drive comprising a rotatable shaft, a driving member mounted thereon for longitudinal movement thereof and rotary movement therewith and adapted to cooperate with and drive a member of the engine to be started, a control member mounted on said shaft for longitudinal movement thereof and rotary movement therewith, a spring between said two members, and a barrel surrounding said spring and forming the driving connection between said members, such barrel being rigidly secured to the control member and loosely connected with the driving member, said spring bearing at one end directly against the control member.

11. Engine starter mechanism, comprising a driven shaft having a gear secured thereto, a driving shaft provided with a threaded portion, a pinion having an unthreaded bore, said pinion normally being out of mesh with the gear, means for causing the pinion to mesh with the gear, comprising an abutment member having threaded engagement with the threaded portion of the driving shaft, and means for positively transmitting motion of rotation from the abutment member to the pinion.

12. Engine starter mechanism, comprising a driven shaft having a gear secured thereto, a driving shaft having a threaded portion, a pinion normally out of mesh with the gear, said pinion having an unthreaded bore, and a threaded abutment member engaging the aforesaid threaded portion and movable axially of the driving shaft, whereby to cause the pinion to move into mesh with the gear and positively to rotate with the driving shaft.

13. In a starter for gas engines and the like, a drive comprising a rotatable screw shaft, a driving member in the form of a pinion capable of rotary and longitudinal movements, a screw member threaded on the shaft for rotary movement therewith and longitudinal movement thereof and controlling the movements of the pinion, and a driving connection for positive rotary driving between such member and pinion.

14. In a starter for gas engines and the like, a drive comprising a rotatable screw shaft, a driving member in the form of a pinion capable of rotary and longitudinal movements, a screw member threaded on the shaft for rotary movement therewith and longitudinal movement thereof and controlling the movement of the pinion, and a driving connection between such members, such connection being rigid with one of the members and being loosely connected with the other member.

15. In a starter for gas engines and the like, a drive comprising a rotatable screw shaft, a driving member in the form of a pinion capable of rotary and longitudinal movements, a screw member threaded on the shaft for rotary movement therewith and longitudinal movement thereof and controlling the movements of the pinion, and a driving connection between such members, such connection being rigid with the control member and connected loosely with the pinion.

16. In a starter for gas engines and the like, a drive comprising a rotatable shaft, a driving member mounted thereon for longitudinal movement thereof and rotary movement therewith and adapted to cooperate with and drive a member of the engine to be started, a control member mounted on said shaft for longitudinal movement thereof and rotary movement therewith, a driving connection between said two members, and throw out cushioning means comprising a coiled spring encircling a portion of the control member and bearing at one end thereagainst, and a ring which is slidably mounted on such portion of the control member and against which the other end of the spring bears.

17. In a starter for gas engines and the like, a drive comprising a rotatable shaft, a driving member mounted thereon for longitudinal movement thereof and rotary movement therewith and adapted to cooperate with and drive a member of the engine to be started, a control member mounted on said shaft for longitudinal movement thereof and rotary movement therewith, a driving connection between said two members, said control being in the form of a sleeve nut having a radial flange at one end, and throw out cushioning means comprising a coiled spring encircling such nut and bearing at one end against the flange, a ring which is slidably mounted on the nut and against which the other end of the spring bears, and a stop which is secured to the shaft and which has a hollow portion whose end is contacted by the ring and into which the nut travels.

18. A drive for engine starters comprising a rotatable shaft a control member mounted thereon for longitudinal and rotary movement, and a driving member adapted to cooperate with and drive a member of the engine to be started and mounted on said shaft in tandem relationship with the control member, said control and driving members being connected rigidly with respect to their rotarial movements.

19. A drive for engine starters comprising a rotatable shaft a control member mounted thereon for longitudinal and rotary movement, and a driving member adapted to cooperate with and drive a member of the engine to be started and mounted on said shaft in tandem relationship with the control member, said members being connected rigidly with respect to rotarial movement and yieldingly with respect to longitudinal movement.

20. A drive for engine starters comprising a control member mounted for longitudinal and rotary movement, a driving member adapted to cooperate with and drive a member of the engine to be started and mounted in tandem relationship with the control member, and a barrel rigidly rotarily connecting such members.

21. A drive for engine starters comprising a control member mounted for longitudinal and rotary movement, a driving member adapted to cooperate with and drive a member of the engine to be started and mounted in tandem relationship with the control member, and a barrel rigidly rotarily connecting such members and arranged to permit the barrel and driving member to have a relative longitudinal movement.

22. A drive for engine starters comprising a control member mounted for longitudinal and rotary movement, a driving member adapted to cooperate with and drive a member of the engine to be started and mounted in tandem relationship with the control member, a barrel rigidly rotarily connecting such members, and a yielding means contained within the barrel and tending to resist the longitudinal movement of the control member subsequent to its initial longitudinal movement.

23. A drive for engine starters comprising a rotatable driving shaft, a driving member mounted for longitudinal and rotary movement and adapted to engage and drive a member of the engine to be started, a control member mounted on the shaft for longitudinal movement thereof and rotary movement therewith and arranged in tandem relationship with the drive member, said driving and control members being connected rigidly with respect to their rotarial movements, and means for connecting such shaft and control member whereby rotation of the shaft will cause movement of the control member and driving member longitudinally of the shaft.

24. A drive for engine starters comprising a rotatable driving shaft, a driving member mounted for longitudinal and rotary movement and adapted to engage and drive a member of the engine to be started, a control member mounted on the shaft for longitudinal movement thereof and rotary movement therewith and arranged in tandem relationship with the drive member, a barrel connecting said driving and control members rigidly with respect to their rotarial movements and yieldingly with respect to longitudinal movements, and means for connecting such shaft and control member whereby rotation of the shaft will cause movement of the control member and driving member longitudinally of the shaft.

25. A drive for engine starters comprising a rotatable driving shaft, a driving member mounted for longitudinal and rotary movement and adapted to engage and drive a member of the engine to be started, a control member mounted on the shaft for longitudinal movement thereof and rotary movement therewith and arranged in tandem relationship with the drive member, a barrel connecting said driving and control members rigidly with respect to their rotarial movements and yieldingly with respect to longitudinal movements, a spring contained within the barrel and encircling the shaft and tending to resist the longitudinal travel of the control member along the shaft subsequent to its initial longitudinal movement thereon in the starting operation.

JOSEPH BIJUR.